(12) United States Patent  
Svoboda et al.

(10) Patent No.: US 6,386,128 B1
(45) Date of Patent: May 14, 2002

(54) METHODS AND SYSTEMS FOR SEED PLANTING MANAGEMENT AND CONTROL

(75) Inventors: John M. Svoboda; J. Richard Hess, both of Idaho Falls; Reed L. Hoskinson, Rigby; David J. Harker, Idaho Falls, all of ID (US)

(73) Assignee: Bechtel BWXT Idaho. LLC, Idaho Falls, ID (US)

( * ) Notice: Subject to any disclaimer, the term of this patent is extended or adjusted under 35 U.S.C. 154(b) by 0 days.

(21) Appl. No.: 09/918,586

(22) Filed: Jul. 30, 2001

(51) Int. Cl.[7] .......................... B67D 5/08; G05D 11/00; A01C 7/00
(52) U.S. Cl. .......................... 111/200; 111/900; 701/50
(58) Field of Search .................. 111/200, 900, 111/922; 701/50; 172/1, 2

(56) References Cited

U.S. PATENT DOCUMENTS 4,424,573 A  * 1/1984  Eckert, Jr. et al. .......... 364/900
5,717,535 A  * 2/1998  French et al. .................. 360/53

* cited by examiner

Primary Examiner—Christopher J. Novosad
(74) Attorney, Agent, or Firm—Workman Nydegger and Seeley

(57) ABSTRACT

A seed planting system providing optimal seed spacing in an agricultural field. The seed planting system includes a mobile seed planter having one or more planting shoes, or members being adapted for towing by a farm vehicle or being self-propelled. Sensors, disposed proximate to respective planting shoes, detect seed planting events and send corresponding signals to a computer. Contemporaneously, a geospatial locator acquires, and transmits to the computer, the geospatial location of each planted seed. The computer correlates the geospatial location data with the seed deposition data and generates a seed distribution profile indicating the location of each seed planted in a zone of interest to enable the control of speed spacing.

37 Claims, 3 Drawing Sheets

METHODS AND SYSTEMS FOR SEED PLANTING MANAGEMENT AND CONTROL

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

FIELD OF THE INVENTION

The present invention relates generally to methods and systems for planting agricultural fields. More particularly, embodiments of the present invention relate to methods and systems which facilitate management and control of seed planting operations so as to optimize the yield and quality of the harvested crop.

PRIOR STATE OF THE ART

There are a variety of factors that affect crop yield and quality. Such factors include disease, insects, seed quality, seed size, seed handling, and seed distribution. With respect to seed distribution in particular, various studies have shown a positive correlation between seed spacing and crop yield and quality. Suboptimal seed spacing may be manifested in a variety of ways. For example, known seed distribution methods and devices frequently produce "skips." Generally, a skip occurs when the seed planter fails to deposit a seed in the required location, thus skipping a location where a seed should have been deposited. In the case of a "double," the opposite problem occurs and two seeds are deposited in a single location. Finally, even in a case where no skips or double are present, the seeds deposited may nevertheless be planted in a less than optimal scheme.

All of the aforementioned scenarios are problematic. A skip, for example, reduces crop yield because it results in fewer seeds being planted than would otherwise be the case. On the other hand, while a double does not reduce the number of seeds planted, double seed placement will not result in the quality or yield that would be achieved by way of two properly spaced seeds. Finally, with respect to overall seed distribution, various studies have shown that it is not simply enough to have evenly distributed seeds, but that the particular distance between adjacent seeds may have a significant affect on overall crop quality and yield. Such studies have likewise shown that, in many cases, there is an optimum seed spacing that corresponds to each particular crop type.

While it is generally acknowledged that proper seed distribution and spacing are important factors in achieving high yield and high quality crops, various factors conspire to inhibit the realization of optimal spacing and distribution. For example, the condition of the soil in which the seeds are to be planted can have a significant affect on the spacing of the seeds. In particular, it is often the case that planting occurs some time after tilling of the field. As a result, the soil dries somewhat between tilling and planting. The relatively wet soil contributes to planter drive wheel slippage, and therefore, often produces an undesirable variation in seed spacing. However, it is difficult to correct for this shortcoming as the farmer has little control over the speed with which the tilled field dries. Further, the farmer cannot significantly alter the speed with which seeds are planted, so as to compensate for the rate of drying of the field, without compromising crop quality and/or yield.

Another problem relating to seed distribution and spacing concerns the variability in seed planter performance. More specifically, it is well known that even if two given seed planters are identical, each seed planter may nevertheless perform somewhat differently than the other. As a result, it generally cannot be assumed that a particular seed planter will perform in a given fashion. Rather, it is typically the case that each seed planter requires constant attention and adjustment in order to increase the likelihood of optimal seed placement and distribution.

While it is generally acknowledged that seed spacing is an important factor in achieving optimized crop yield and quality, obtaining information, after the fact, about seed spacing is somewhat problematic. Currently, the only way the farmer can be certain as to the actual spacing of the planted seeds is to dig up a selected portion of the field and verify the actual seed spacing. Such seed spacing verification is rarely performed because at a minimum it is time consuming. Further, even if the farmer was able to identify a problem with respect to the seed spacing, the current state of the art regarding planter performance, coupled with factors such as soil moisture, would likely substantially preclude implementation of an effective response to an identified seed spacing problem.

Responsive to the foregoing problems, various attempts have been made to devise methods and systems directed toward providing a relative improvement in the performance of seed planters with respect to seed spacing and distribution schemes. One known system uses sensors, in conjunction with various algebraic relations, to count the number of seeds actually placed in the field. However, while such a system may be effective in obtaining accurate seed counts, such systems typically rely on a so-called "averaging function" to determine an average seed spacing for each row that is planted, based upon seed planter speed and the number of seeds planted. It is an inherent feature of such averaging functions that they produce results based upon the assumption that seeds are placed at substantially regular intervals. As indicated in the previous discussion however, various factors conspire to inhibit optimum seed spacing, and an averaging function is, accordingly, generally ineffective in serving as a reliable indicator of actual seed spacing.

Thus, while seed planting methods and systems that employ averaging functions may be affective in obtaining accurate seed counts and determining average spacing of seeds, they are generally ineffective in providing the farmer with data as to the actual spacing of the seeds. As with other systems, a farmer using such a system would likely be compelled to dig up a portion of the field in order to determine where the seeds were actually placed. Accordingly, such systems are not particularly helpful in identifying seed spacing problems such as would require some type of remedial action and thus do little to improve crop quality or yield.

Further, because such systems typically provide the seed planter operator only with average seed spacing information, it is often the case that remedial action taken by the planter operator is not effective in any event with regard to actual seed spacing. Generally then, such systems provide only half the seed planting information that the farmer needs to optimize crop quality and crop yield. That is, such systems may be effective in providing data as to the number of seeds actually planted, but generally do not provide the farmer with data regarding the actual spacing of the seeds that are planted. Without such data, the farmer is unable to take effective remedial action to optimize crop quality and yield.

In view of the foregoing problems and shortcomings, and others, with existing seed planting systems, it would be an advancement in the art to provide a seed planting system that provides the farmer with accurate data both as to the number of seeds actually planted and the actual spacing, or geospatial location, of each seed planted. Further, the seed planting system should acquire both seed location data and seed deposition data substantially in real time so that the operator of the seed planter can take timely remedial action with regard to the number and spacing of the seeds. Also, the seed planting system should collect seed location data in a manner and form suitable for supporting subsequent develop of a seed distribution profile. Additionally, the seed planting system should be configured to facilitate real time management and control of the seed planter based upon seed location data and seed deposition data acquired by the seed planting system. Finally, the seed planting system should be rugged and durable, and suitable for use in a variety of weather and soil conditions.

BRIEF SUMMARY OF THE INVENTION

The present invention has been developed in response to the current state of the art, and in particular, in response to these and other problems and needs that have not been fully or completely solved. Briefly summarized, embodiments of the present invention provide for a seed planting system which gathers seed deposition data and seed location data in real time so as to facilitate, among other things, development of seed distribution profiles, and substantially real time control of a seed planter.

Embodiments of the present invention are especially well suited for use in the context of potato seed planters and the like. However, it will be appreciated that embodiments of the present invention may be profitably employed in any application where it is desired to optimize crop yields and crop quality through the vehicle of optimized seed, seedlings, plant segments, plantlets, kernel and the distribution thereof.

In one embodiment of the invention, a seed planting system is provided that includes a seed planter having at least one sensor configured and arranged to acquire seed deposition data. Additionally, a geospatial locator, preferably a global positioning system or the like, is configured and arranged to interact with the sensor so as to acquire seed location data for each planted seed detected by the sensor. The seed planting system includes a computer in communication with the sensor and the geospatial locator. Finally, a communications link, preferably radio frequency (RF) based, communicates with the computer.

In operation, the sensor, preferably disposed proximate to the shoe of the planter, detects the location of the seed in the furrow after the seed has passed through the shoe. The sensor generates a signal which is sent to the computer indicating that a seed has been planted. At substantially the same time, the geospatial locator sends the geographic location of the seed to the computer and the computer correlates the geographic data with the seed plant signal sent to the computer by the sensor. Such data is preferably stored at the computer, and may also be transmitted to a remote location by way of the communications link. In this way, the seed planting system is effective in counting the total number of seeds planted, as well as determining the geographic location of each seed. Such information may then be used to develop a seed distribution profile which indicates, among other things, the distribution and location of each seed planted by the seed planter. By comparing, for example, crop yields and quality with such a seed distribution profile, the farmer is then able to implement any necessary changes in subsequent planting of the particular field.

Preferably, the seed deposition data and the seed location data used to develop the seed distribution profile are acquired substantially in real time. Thus, such data are effective not only in facilitating development of seed distribution profiles, but also in implementing, through the computer and a control module in communication with the computer, any necessary corrective actions concerning the operation and performance of the seed planter.

These and other features and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF THE INVENTION

Reference will now be made to figures wherein like structures will be provided with like reference designations. It is to be understood that the drawings are diagrammatic and schematic representations of various embodiments of the invention, and are not to be construed as limiting the scope of the present invention in any way.

Figure 1:
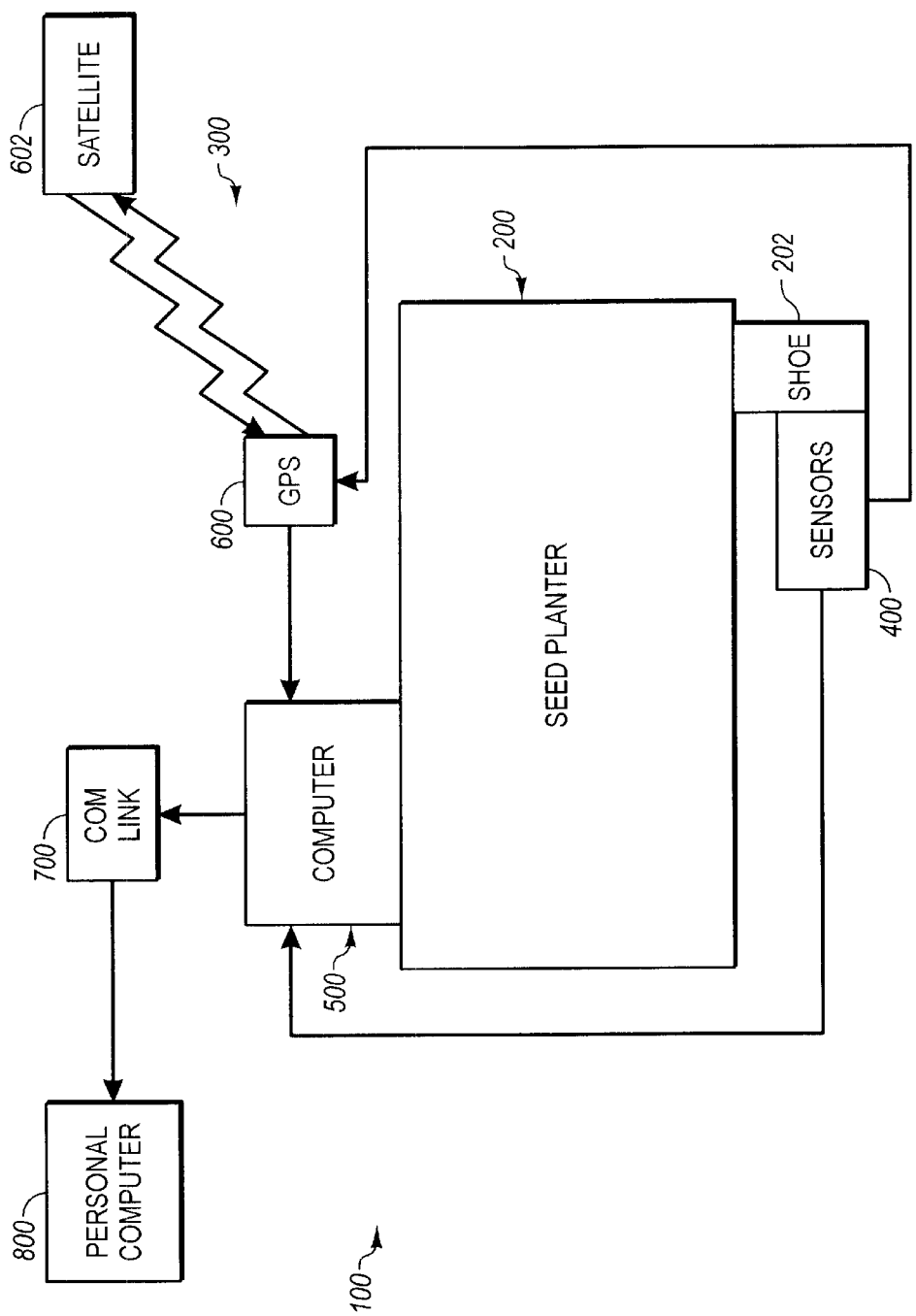
FIG. 1 is a schematic view illustrating interrelations of various components of an embodiment of a seed planting system according to the present invention.
Figure 2:
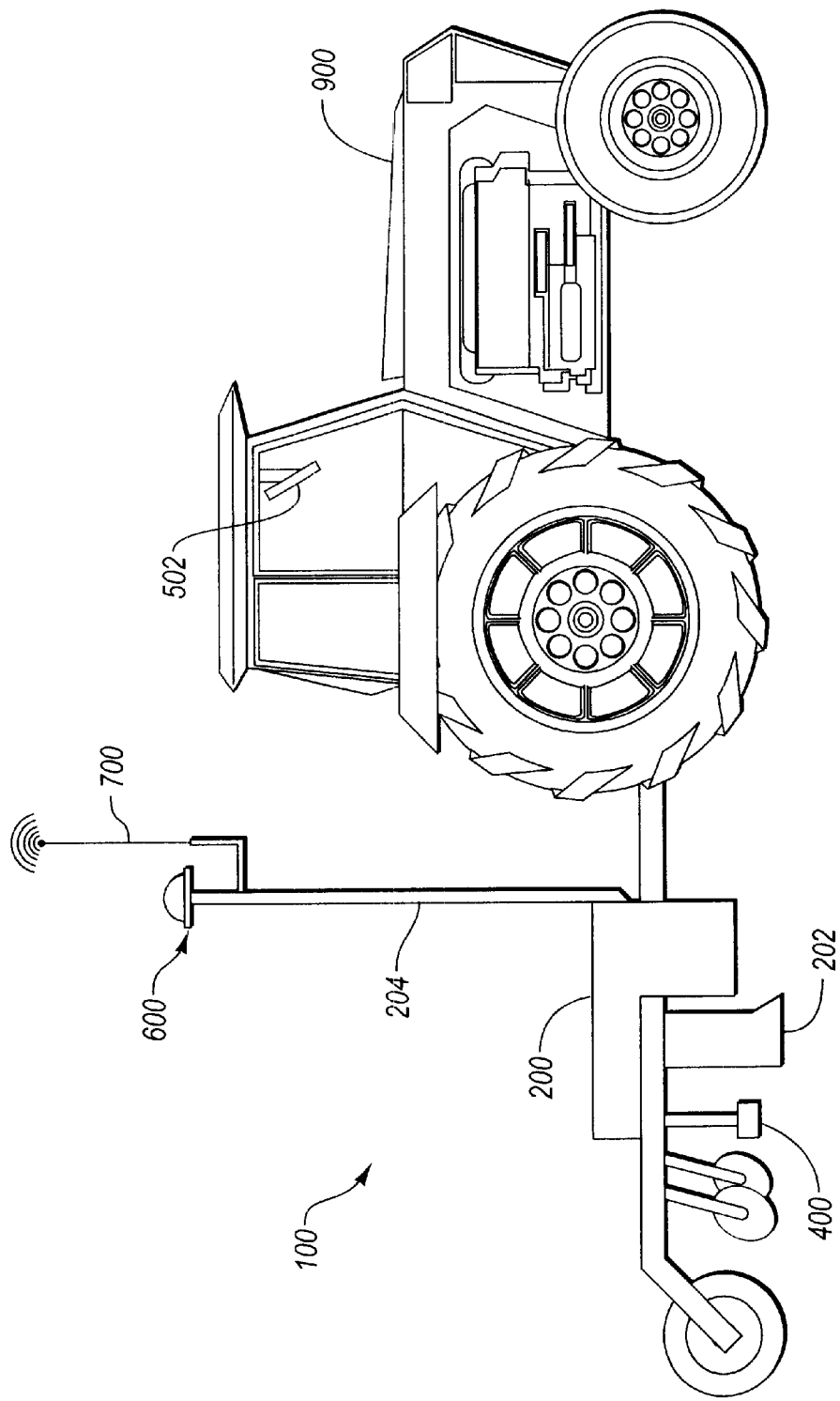
FIG. 2 is a side view indicating an exemplary implementation of an embodiment of a seed planting system.
Figure 3:
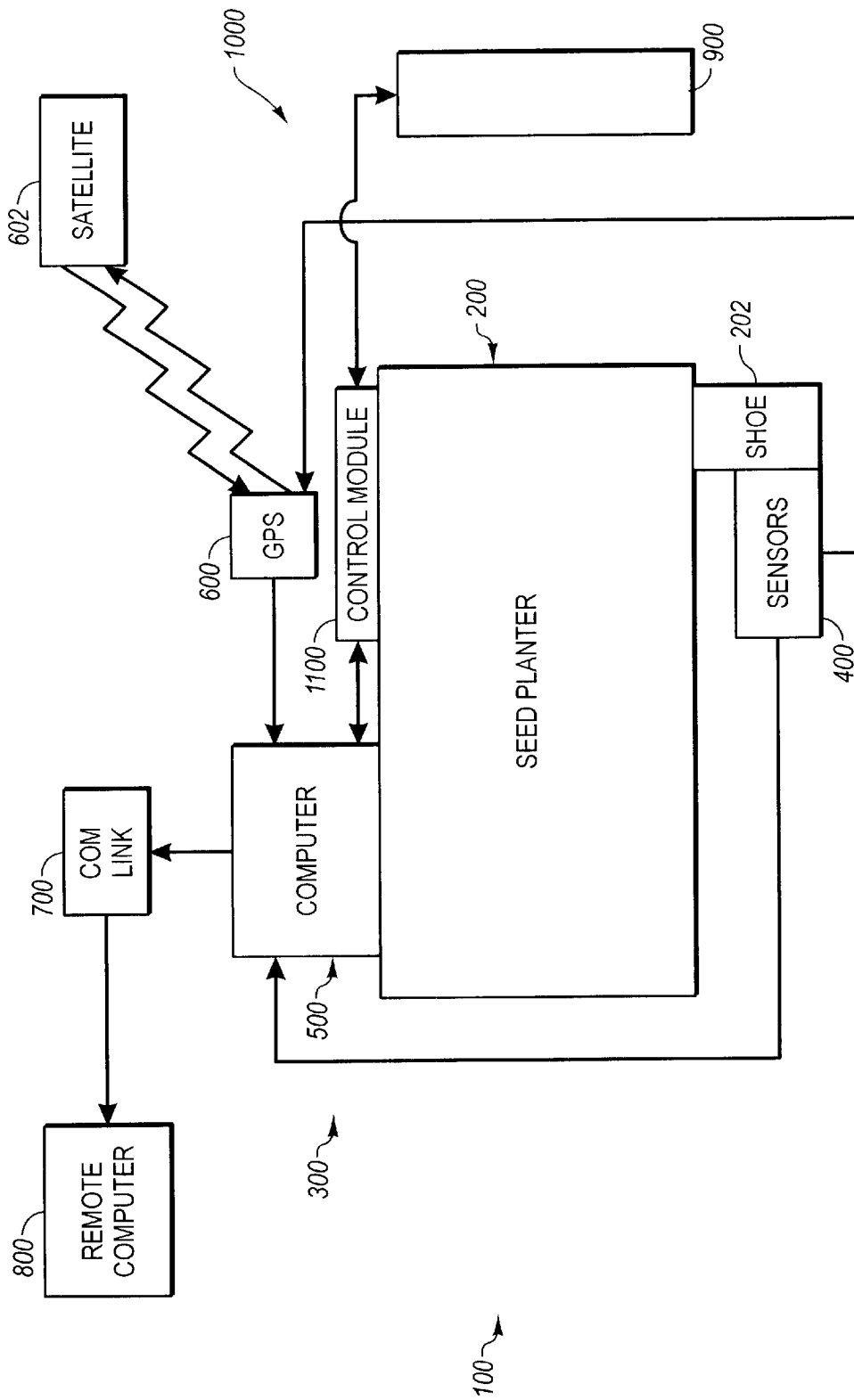
FIG. 3 is a schematic view illustrating interrelations of various components of an embodiment of a seed planting system used in conjunction with a control module to implement substantially real time management and control of a seed planter.

In general, the present invention relates to an improved seed planting system which facilitates development of seed distribution profiles and which facilitates substantially real time control of a seed planter. FIGS. 1 through 3 indicate various embodiments of a seed planting system conforming to the teachings of the invention.

Reference is first made to FIG. 1, wherein an embodiment of a seed planting system is indicated generally at 100. In general, seed planting system 100 includes a seed planter 200 and a seed planting data acquisition system 300. More particularly, seed planter 200 comprises a potato seed planter or the like, suitable for towing such as by a farm vehicle (FIG. 2), and includes one or more planter members, or shoes, 202 configured and arranged to facilitate planting of seeds in a field. While embodiments of the present invention are well suited for use in potato seed planting applications, it will be appreciated that embodiments of the present invention are equally suited for use in various other applications as well. Accordingly, the foregoing exemplary application should not be construed to limit the scope of the present invention in any way. It will further be appreciated that seed planting data acquisition system 300 may be provided as an integral component or system of seed planter 200, or may alternatively be supplied as after-market seed planting data acquisition kit for retrofit of one or more different types of seed planters. Both such arrangements are contemplated as being within the scope of the present invention.

In general, seed planting data acquisition system 300 includes one or more sensors 400. Preferably, one sensor 400 is provided for each planter shoe, or planter member, 202 and is positioned proximate to planter shoe 202 so that sensor 400 can sense the seed piece just prior to capture of the seed piece by the soil, without interfering with the freefall of the seed piece through planter shoe, or member, 202. In one embodiment of the invention, sensor 400 is mounted in the forward compartment of planter shoe 202, however, other locations may be suitable as well. In this location, sensor 400 is able to sense the seed drop without comprising the freefall of the seed from the planter shoe to the soil. Finally, it will be appreciated that every planter shoe 202 of seed planter 200 need not have a corresponding sensor 400. Rather, sensors 400 may be employed in any desired configuration or number with respect to planter shoe(s) 202.

It will be appreciated that various types of sensors 400 may be employed consistent with the teachings of the present invention. Sensor 400 configurations contemplated as being within the scope of the present invention, include, but are not limited to, optical sensors, electromagnetic field type sensors, infra-red sensors, sonic sensors, electromechanical sensors, laser sensors, interrupted light sensors, and the like. In general, any sensor 400 capable of reliably and consistently sensing the capture of a seed by the soil is contemplated as being within the scope of the present invention.

Each sensor 400, in turn, is placed in communication with computer 500 and a geospatial locator 600. Preferably, geospatial locator 600 comprises a global positioning system (GPS) receiver or the like. However, it will be appreciated that a variety of systems and devices may be profitably employed to perform the functions, enumerated herein, of geospatial locator 600. Accordingly, geospatial locator 600 is but one example of a means for acquiring seed location data. It should be understood that geospatial locator 600 is presented solely by way of example and should not be construed as limiting the present invention in any way. Consistent with the foregoing, it will be appreciated that any other type of system or device that is effective to contemporaneously acquire geospatial location data with respect to each planted seed is contemplated as being within the scope of the present invention. Furthermore, other suitable geospatial locators include, without limitation, radar/speed sensor systems, mechanical measurement devices such as measuring wheels, optical sensors utilizing known datum points proximate a given field and line-of-sight measurements from such datum points to obtain geo-spatial data, radio-telemetry devices and other electro-magnetic wave receiver and transceiver based systems.

In one embodiment of the invention, geospatial locator 600 relies on one or more satellites 602 to facilitate acquisition of geospatial location data for each planted seed. Finally, seed planting data acquisition system 300 additionally includes a communication link 700, preferably a radio frequency (RF) antenna or the like, which communicates with computer 500 and broadcasts various data, discussed below, to one or more remote computers 800.

Directing attention now to FIG. 2, one exemplary arrangement of a seed planting system 100 according to the present invention is indicated. As indicated in FIG. 2, seed planter 200 is preferably arranged for towing by a farm vehicle 900. Preferably, farm vehicle 900 comprises a tractor or the like. However, it will be appreciated that various other vehicles including, but not limited to, trucks, pickup trucks, or the like, would likewise be suitable to perform the functions enumerated herein, of farm vehicle 900. Furthermore, a seed planting system embodying the present invention need not be pulled by a powered vehicle such as farm vehicle 100, but may alternatively be constructed to be self-propelled and provided with on-board or remotely controlled steering. That is, a seed planter embodying the present invention could easily be constructed to include an on-board prime mover such as an internal combustion engine or other type of engine, motor, or means of propulsion and be provided with either a manual steering system, an automated steering system, or a remotely controlled steering system.

With continuing reference now to FIG. 2, geospatial locator 600 and communications link 700 are preferably mounted to seed planter 200 by way of a mast 204. It will be appreciated, however, that various other mounting configurations for geospatial locator 600 and/or communications link 700 may be employed. Accordingly, the scope of the present invention should not be construed to be limited solely to the illustrated embodiment. Finally, as indicated in FIG. 2, computer 500 (not shown) further includes a monitor 502 arranged inside the cab of farm vehicle 900.

Directing attention now to both FIGS. 1 and 2, details are provided regarding various aspects of the operation of seed planting system 100. Generally, farm vehicle 900 pulls seed planter 200 through a designated agricultural field and seed planter 200 deposits seeds, such as but not limited to, potato seeds, into the soil by way of planter shoe(s) 202. The term "seed" as used herein includes, but is not limited to, seeds, kernals, whole plants, segments of a plant or segments of a portion of a plant such as segments of whole potatoes or segments of a potato, plantlets, seedlings, sets of a plant, and any various combinations thereof. Sensor(s) 400 detects the falling seed and transmits a corresponding signal to computer 500 which then records the seed drop event. At substantially the same time, geospatial locator 600 then determines the geospatial location of the planted seed, and the seed location information is transmitted to computer 500 which then correlates the seed location data provided by geospatial locator 600 with the seed drop event, or seed deposition, identified by sensor 400. Preferably, computer 500 also correlates the speed of farm vehicle 900, obtained by a suitable planter speed sensor (not shown) in communication with computer 500, to a series of seed drop events so that real time, or other, analyses may be performed regarding the effect of the speed of farm vehicle 900 on seed spacing. In one embodiment of the invention, such real time analyses permits the operator to, for example, vary the speed of farm vehicle 900 if the spacing between adjacent seeds is not acceptable.

It will be appreciated that in various embodiments of the invention, different planting rates may be selected for one or more planting shoes 202 and/or different planting rates may be selected for one or more different areas of a given field. In this way, the farmer can simultaneously log data regarding a variety of planting rates and seed spacing schemes. Such data may be used for, among other things, facilitating the performance of various comparative analyses with respect to planting rates, seed spacing, and other considerations.

Because the process of recording seed deposition data and seed location data is repeated for each seed, computer 500 accumulates complete seed deposition data and seed location data for the entire field, or other designated zone of interest. Additionally, computer 500 continuously processes the accumulated seed deposition data and seed location data received from sensors 400 and geospatial locator 600, respectively, and generates, among other things, a summary seed placement histogram that represents the real time variation in seed spacing and thereby ensures that the operator has continuous and contemporaneous access to current seed location and seed deposition data. Such data permits the operator to readily ascertain placement of seeds relative to the desired location and to accordingly take such remedial action as may be necessary to ensure that the planted seeds are properly spaced. By way of example, one such remedial action comprises adjusting a seed planting parameter, wherein such seed planting parameters include, but are not limited to, planter speed, seed spacing, number of seeds deposited, and location of seeds deposited.

Preferably, the summary seed placement histogram generated by computer 500 is configured to indicate the integrated variation in seed spacing over a predetermined time interval, preferably the immediately preceding ten second time period, and is displayed on monitor 502 in the cab of farm vehicle 900 and/or another location, so as to be readily observable by an operator. Note that while the seed deposition data and seed location data are preferably displayed in the form of a summary seed placement histogram, it will be appreciated that a summary seed placement histogram is but one way of displaying, or otherwise presenting, the information acquired by sensors 400 and geospatial locator 600, and that various other types of display or presentation schemes may be employed consistent with a particular application and/or to facilitate achievement of one or more desired results.

Further, it will be appreciated that the seed deposition data and seed location data accumulated by computer 500 may be employed for various other purposes as well. For example, such data may be processed by computer 500 to produce, among other things, a seed distribution profile indicating, preferably graphically, both the number and specific location of each seed planted in the field or zone of interest. Note that while such seed distribution profiles are preferably arranged in a graphical representation, it will be appreciated that seed distribution profiles may be organized and arranged in various other configurations as required to suit a particular application. The seed distribution profiles thus generated permit a farmer to perform various useful analyses. By way of example, a seed distribution profile allows a farmer to manage crop planting and other evolutions through identification and analysis of correlations between seed spacing and crop parameters such as quality and yield.

In addition to their use in development of seed distribution profiles and summary seed placement histograms, seed deposition data and/or seed location data are also well suited for manipulation by data base programs and the like. By way of example, seed deposition data and/or seed location data may be evaluated on a yearly basis and compared with crop yield and crop quality parameters corresponding to a particular year so that various trend analyses and the like can be performed with respect to the relation between such parameters and the recorded seed spacing and distribution.

Another feature of embodiments of the present invention is that because seed planting system 100 records the location of each seed that is planted, embodiments of the present invention provide for a relative increase in the accuracy of seed location data over systems and methods which use averaging functions to determine seed location. Such seed location data has, in addition to the benefits discussed above, various other applications as well. For example, seed location data may be correlated to changing seed lots, on-the-go seed planter adjustments, and/or changing planting conditions. Such information permits the operator of seed planting system 100 to compensate for various conditions, such as dry soil, which may otherwise act to inhibit proper spacing of seeds.

With continuing attention now to FIGS. 1 and 2, details are provided regarding various additional features of an embodiment of seed planting system 100. As indicated earlier, seed planting system 100 preferably includes a communications link 700 configured and arranged to facilitate wireless communication between computer 500 and one or more remote computers 800. Preferably, communications link 700 comprises a radio frequency (RF) based link, or the like. However, it will be appreciated that various other types of wireless links including, but not limited to, cellular and satellite based links may likewise be employed.

Communications link 700 preferably comprises an antenna, or similar device, in communication with computer 500 so that data acquired by computer 500 by way of sensors 400 and geospatial locator 600 can be communicated from computer 500 to one or more remote computers 800. Such data may be communicated to remote computer 800 either before or after processing by computer 500. In one exemplary arrangement, remote computer 800 is located in an office so that a farm manager can view, preferably in real time, seed location data and seed deposition data gathered and/or processed by seed planting system 100. It will be appreciated that remote computer 800 may comprise a portion of an enterprise-wide intranet, or local area or wide area network. It will further be appreciated that the data transmitted from computer 500 by way of communications link 700 can be broadcast to a variety of other sites as well, and is not limited solely to broadcasting to remote computer 800.

Directing attention now to FIG. 3, details are provided regarding various features of a seed planting control system 1000. As aspects of the system illustrated in FIG. 3 are similar in many regards to those illustrated in FIG. 1, the present discussion will focus primarily on the additional features illustrated in FIG. 3.

In particular, a seed planting control system 1000, which includes seed planting data acquisition system 300 and control module 1100, is provided. As illustrated in FIG. 3, control module 1100 is in communication with computer 500 and is configured and arranged to transmit control signals to the engine control system and/or drive control system (not shown) of farm vehicle 900, as well as or alternatively with seed planter 200. In one embodiment of the invention control module 1100 is also configured to receive, from the engine control system and drive control system of farm vehicle 900, or alternatively seed planter 200, signals indicating the current performance parameters, speed for example, of farm vehicle 900, or alternatively seed planter 200.

In operation, seed deposition data acquired by sensor 400, and seed location data acquired by geospatial locator 600, is continuously fed to computer 500 where it is processed and compared with various predefined planting parameters, an example of which comprises spacing between successive seeds. In the event any of the data gathered and processed by computer 500 fails to conform with one or more of the predetermined planting parameters, computer 500 generates appropriate corresponding instructions which are then transmitted to control module 1100. In an alternative embodiment, computer 500 selects appropriate instructions from a database of predefined instructions. In yet another alternative embodiment, data gathered and processed by computer 500 is transmitted to remote computer 800 by way of communications link 700. In response to the received data, appropriate instructions are generated at remote computer 800 and then transmitted to computer 500, and thence to control module 1100.

Upon receipt of instructions from computer 500, or remote computer 800, control module 1100 then causes seed planter 200 and/or farm vehicle 900 to respond in a manner corresponding to the instructions received. By way of example, if the data received by computer 500, or remote computer 800, indicates that spacing between adjacent seeds is greater than desired, the instructions transmitted by computer 500, or remote computer 800, to control module 1100 may be such as to result in control module 1100 causing farm vehicle 900 and/or seedplanter 200 to decrease speed and thereby decrease spacing between adjacent seeds. Preferably, embodiments of seed planting control system 1000 also include a manual override capability which allows an operator to take manual control of farm vehicle 900 and/or planter 200.

In this way, seed planting control system 1000 permits substantially real time control of seed planting system 100 so as to continuously adjust for changing field conditions and the like. Consequently, the farmer can be assured that, notwithstanding any complicating factors, the seeds deposited in the ground will be spaced and arranged according to the predetermined criteria. In this regard, at least, embodiments of the present invention represent an advancement over the prior art in that they permit real time control and automatic adjustment of seed planting system 100 in a manner consistent with the predetermined or optimal seed-planting criteria.

Finally, it will be appreciated that various methods and processes disclosed herein may be embodied in source code, executable code, computer software, and the like. In one embodiment of the invention, the various operations performed by computer 500 are performed as a result of computer executable instructions carried on a hard disk of computer 500, or on other computer-readable media, including but not limited to, optical disks, magnetic disks and the like. In this example, the various operations performed by such software include, but are not limited to, receiving and storing seed deposition data from sensor 400, receiving and storing seed location data from geospatial locator 600. Once such data has been stored in a suitable database or data structure, the software causes a processor in computer 500 to process the data, for example, by correlating the received data to various predetermined instructions, and to then transmit corresponding instructions to control module 1100. Further, the software then receives feedback from control module 1100 indicating that seed planter 200 and/or farm vehicle 900, for example, has responded to instructions transmitted by computer 500. Various other aspects regarding the computer software include graphical user interfaces such as may be presented on display 502 of computer 500, and the software further includes various provisions for presenting the data in any of a variety of different ways.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:
1. A seed planting system, comprising:
   a mobile seed planter; and
   a seed planting data acquisition system including:
      at least one sensor mounted to the mobile seed planter and configured and arranged to acquire seed deposition data;
      a geospatial locator configured and arranged to acquire seed location data corresponding to the seed deposition data; and
      a computer in communication with the at least one sensor and the geospatial locator, the computer receiving and processing the seed deposition data and the seed location data.

2. The seed planting system of claim 1, wherein the geospatial locator comprises at least one of the group consisting of a global positioning system, a radar/speed sensor system, a mechanical measurement device, an optical sensor, a radio-telemetry device, and an electro-magnetic wave transceiver based system.

3. The seed planting system of claim 1, wherein the mobile seed planter comprises a potato seed planter.

4. The seed planting system of claim 1, wherein the mobile seed planter comprises at least one planting shoe and the at least one sensor being mounted proximate to the at least one planting shoe.

5. The seed planting system of claim 1, wherein the at least one sensor comprises at least one of the group consisting of an electromagnetic field sensor, optical sensor, infra-red sensor, sonic sensor, electromechanical sensor, laser sensor, and interrupted light sensor.

6. The seed planting system of claim 1, further comprising a communications link in communication with the computer.

7. The seed planting system of claim 6, wherein the communications link comprises an electromagnetic wave receiver.

8. The seed planting system of claim 1, further comprising at least one planter speed sensor in communication with the computer.

9. The seed planting system of claim 1, further comprising a display panel in communication with the computer and located so as to be visible to an operator of the mobile seed planter.

10. A seed planting data acquisition kit suitable for use in conjunction with a seed planter, the seed planting data acquisition kit comprising:
   at least one sensor configured to acquire seed deposition data;
   a geospatial locator configured to acquire seed location data corresponding to the seed deposition data; and
   a computer configured for communication with the at least one sensor and the location acquisition system, the computer receiving and processing the seed deposition data and the seed location data.

11. The seed planting data acquisition kit of claim 10, further comprising a communications link in communication with the computer.

12. The seed planting data acquisition kit of claim 11, wherein the communications link comprises a electromagnetic wave receiver.

13. The seed planting data acquisition kit of claim 10, wherein the geospatial locator comprises a global positioning system receiver.

14. The seed planting data acquisition kit of claim 10, further comprising at least one planter speed sensor in communication with the computer.

15. The seed planting data acquisition kit of claim 10, further comprising a display panel in communication with the computer.

16. A seed planting data acquisition kit suitable for use in conjunction with a seed planter, the seed planting data acquisition kit comprising:

at least one sensor configured to acquire seed deposition data;

means for acquiring seed location data corresponding to the seed deposition data; and a computer configured for communication with the at least one sensor and the location acquisition system, the computer receiving and processing the seed deposition data and the seed location data.

17. The seed planting data acquisition kit of claim 16, wherein the means for acquiring seed location data comprises a global positioning system, a radar/speed sensor system, a mechanical measurement device, an optical sensor, a radio-telemetry device, and a electro-magnetic wave transceiver based system.

18. A mobile seed planter configured for accommodating a seed planting control system suitable for implementing substantially real time management and control of the mobile seed planter, the seed planting control system comprising:

a control module in operative communication with a vehicle including a prime mover; and a seed planting data acquisition system including:

at least one sensor mounted to the mobile seed planter and configured and arranged to acquire seed deposition data;

a geospatial locator configured and arranged to acquire seed location data corresponding to the seed deposition data; and a computer in communication with the at least one sensor and the geospatial locator, the computer receiving the seed deposition data and the seed location data and transmitting instructions to the control module, the instructions corresponding to received seed deposition data and seedlocation data, and the control module using the instructions to cause a corresponding response by the vehicle including a prime mover.

19. The seed planting control system of claim 18, further comprising at least one remote computer configured for communication with the computer by way of a communications link, the instructions being generated at the remote computer and transmitted to the computer by way of the communications link.

20. The seed planting control system of claim 18, further comprising a planter speed sensor in communication with the computer, the control module adjusting speed of the vehicle in response to data provided by the planter speed sensor.

21. The seed planting control system of claim 18, wherein the vehicle including a prime mover is a farm vehicle capable of towing the mobile seed planter.

22. The seed planting control system of claim 18, wherein the vehicle including a prime mover is integral with the mobile seed planter so as to be self-propelled.

23. A method for seed planting with a mobile seed planter comprising:

(a) depositing a seed;

(b) acquiring seed deposition data for the deposited seed;

(c) acquiring seed location data for the deposited seed;

(d) processing the seed deposition data and the seed location data;

(e) adjusting at least one seed planting parameter consistent with the seed deposition data and the seed location data; and (f) repeating steps (a) through (e).

24. The method of claim 23, wherein adjusting at least one seed planting parameter comprises adjusting planter speed.

25. The method of claim 23, further comprising storing the seed deposition data and the seed location data.

26. The method of claim 23, wherein the adjusting of at least one seed planting parameter occurs substantially automatically.

27. The method of claim 23, wherein the acquiring of seed deposition data for the deposited seed occurs substantially in real time.

28. The method of claim 23, wherein the acquiring of seed location data for the deposited seed occurs substantially in real time.

29. The method of claim 23, further comprising displaying at least a portion of the seed deposition data and the seed location data.

30. The method of claim 29, wherein displaying at least a portion of the seed deposition data and the seed location data comprises displaying at least a portion of the seed deposition data and the seed location data in a form of a histogram.

31. The method of claim 29, wherein displaying at least a portion of the seed deposition data and the seed location data in the form of a histogram comprises indicating an integrated variation in seed spacing over a predetermined time interval.

32. The method of claim 29, wherein the displaying of at least a portion of the seed deposition data and the seed location data occurs after the processing of the seed deposition data and the seed location data.

33. In conjunction with planting of an agricultural field, a method for generating a seed distribution profile, the method comprising:

acquiring seed deposition data for a plurality of seeds;

acquiring seed location data for each of the plurality of seeds; and arranging at least the seed location data in a predetermined format.

34. The method of claim 33, wherein arranging at least the seed location data in a predetermined format comprises using a graphical display.

35. The method as recited in claim 33, wherein the seed location data is acquired substantially in real time.

36. The method as recited in claim 33, wherein the seed deposition data is acquired substantially in real time.

37. The method as recited in claim 33, wherein the seed location data comprises geospatial location data.

\* \* \* \* \*